United States Patent [19]

Wood

[11] Patent Number: 4,613,282
[45] Date of Patent: * Sep. 23, 1986

[54] GEAR CONNECTION AND BRAKE ASSEMBLY

[75] Inventor: Charles F. Wood, Mississauga, Canada

[73] Assignee: Indal Technologies Inc., Mississauga, Canada

[*] Notice: The portion of the term of this patent subsequent to Apr. 23, 2000 has been disclaimed.

[21] Appl. No.: 107,933

[22] Filed: Dec. 28, 1979

[51] Int. Cl.[4] .............................................. F03D 7/06
[52] U.S. Cl. ...................................... 416/36; 416/44; 416/45; 416/169 R; 188/84
[58] Field of Search ................. 416/32, 36, 45, 169 R, 416/169 B, 170 R, 227 A, 44 A, 51 A; 188/84, 187; 303/10; 415/18, 123

[56] References Cited

U.S. PATENT DOCUMENTS

| | | | |
|---|---|---|---|
| 47,039 | 3/1865 | Reese | 188/84 |
| 960,394 | 6/1910 | Pickering | 416/32 |
| 1,408,905 | 3/1922 | Pearson | 416/32 |

*Primary Examiner*—Leonard E. Smith

*Attorney, Agent, or Firm*—Ivor M. Hughes

[57] ABSTRACT

An improved gear box assembly is provided for a vertical axis wind turbine, the vertical axis wind turbine having a rotor having a centrally disposed axis oriented in the vertical direction, a bull gear supporting the rotor, a base below the bull gear, the bull gear being adapted to rotate above the base, the bull gear and base presenting a hollow housing and shaft terminating in an inner end wall and end surface respectively, the housing for receiving the shaft, one of the said hollow housing or shaft being stationary and the other being rotatable with respect thereto and secured to the bull gear, the shaft and housing when secured together presenting a space between the inner end wall and end surface, bearings supported between the housing and shaft, and sealing means for sealing the space between the housing and shaft, a fluid passageway extending into the space created between the inner end wall and end surface for feeding hydraulic fluid under pressure into the space for hydraulically elevating the bull gear relative to the base, means precluding the gear from rising more than a predetermined or controlled distance, means for feeding the fluid under pressure to, and means for draining the fluid from, the space, and a reservoir for such fluid.

32 Claims, 7 Drawing Figures

GEAR CONNECTION AND BRAKE ASSEMBLY

FIELD OF INVENTION

This invention relates to wind turbines and particularly, improved gear box assemblies, sub-assemblies and components therefor, and a braking system adaptable for use with such improved gear box assembly.

BACKGROUND OF THE INVENTION

In Darrieus Wind Turbines, the vertical rotor shaft must be supported at its lower end and arranged to rotate a gear connected to a generator for generating electricity, or for powering equipment when the shaft rotates. This support is normally in the form of a ball or roller thrust bearing through which high forces are transmitted from the rotating shaft, through to the stationary supporting foundation. This bearing has a limited life and consumes energy in the form of friction.

In emergencies, the wind turbine must be shut down as quickly as possible. In this case, the angular speed must be reduced to zero or to an angular speed at which the emergency ceases to affect the operation of the wind turbine, and this must all be done almost instantaneously. No "fail safe" method of achieving this result has been achieved.

In addition, the upper end of the vertical shaft of the Darrieus Rotor is normally supported by any wires. The length of these cables fluctuates with temperature varying the tension in the wires. Consequently, the natural frequency of the wires are affected which can from time to time, cause the wires to sympathetically vibrate by the action of the rotor and become a hazard to the operation of the wind turbine.

It is therefore, an object of this invention to provide a gear box assembly, sub-assemblies and components therefor, which overcome the aforementioned deficiencies of the prior art structures.

Further and other objects of the invention will be realized by those skilled in the art from the following summary of the invention and detailed description of preferred embodiments thereof.

SUMMARY OF THE INVENTION

According to one aspect of the invention, an improved gear box assembly is provided for a vertical axis wind turbine, the vertical axis wind turbine having, a rotor having a centrally disposed axis oriented in the vertical direction, a bull gear supporting the rotor, a base below the bull gear, the bull gear being adapted to rotate above the base, the bull gear and base presenting a hollow housing and shaft, the bull gear and base presenting a hollow housing and the shaft terminating at an and end surface, the housing for receiving the shaft, one of the said hollow housing or shaft being stationary, and the other being rotatable with respect to the stationary component, and being secured to the bull gear, the shaft and housing when secured together presenting a space between the inner end wall and end surface, bearings supported between the housing and shaft for the transmission of loads from housing to the shaft, sealing means between the housing and shaft for sealing the space between the housing and shaft, a fluid passageway extending into the space created between the end wall and end surface, preferably opening through the said surface, for feeding hydraulic fluid under pressure into the space for hydraulically elevating the bull gear relative to the base, means precluding the gear rising more than a predetermined or controlled distance (in one embodiment comprising the guy wires secured to the upper end of the rotor) means for feeding the fluid under pressure to, and means for draining the fluid from, the space and a reservoir for such fluid;

According to another aspect of the invention, the gear box assembly includes brake pads between the base and bull gear, (the brake pads being substantially of the same material as used in automobiles) to stop the motion of the gear relative to the base when the gear is lowered onto the base;

According to another aspect of the invention, an improved gear box assembly is provided for a vertical axis wind turbine, the vertical axis wind turbine having, a rotor having a centrally disposed axis oriented in the vertical direction, a gear supporting the rotor, the bull gear having a centrally disposed annular hub of a predetermined inner diameter, terminating at a hub end wall, the bull gear for transfering power generated by the wind, the improved gear box assembly comprising, a stationary centrally disposed cylindrical vertical shaft of a slightly lesser outer diameter than the internal diameter of the hub and having an upper end, the cylindrical vertical shaft for being received in the hub, bearings supported between the hub and vertical shaft for supporting the gear for rotation and sealing means for sealing the space between the vertical shaft and inner wall of the hub, means for spacing the upper end of the vertical shaft from engaging the end wall of the hub, a fluid passageway extending into the space created between the hub end wall and vertical shaft, preferably opening through the upper end of the vertical shaft, for feeding hydraulic fluid under pressure against the hub end wall for raising and vertically supporting the gear hydraulically with respect to the vertical shaft, means precluding the gear rising more than a predetermined or controlled distance, (in one embodiment, being the guy wires), means for draining the fluid from the space between the hub and vertical shaft and a reservoir for such fluid;

According to another aspect of the invention, the bearings may also comprise the sealing means;

According to another aspect of the invention, a braking system is provided for a vertical axis wind turbine having a bull gear having a hub for seating over, and rotating about, a vertical shaft, supported on a stationary base in the wind turbine, the gear being adapted to be raised and lowered relative to the shaft and base for engagement with the base, and brake pads disposed between the base and bottom of the bull gear to stop the motion of the gear relative to the base when the gear is lowered onto the base. This braking system finds particular application in a wind turbine incorporating the improved gear box assembly aforesaid. In that event, the hydraulic fluid is fed through the fluid passageway causing the gear to be hydraulically supported free of the case and thus the braking action of the brake pads, rotate about the vertical shaft when wind conditions are suitable, with minimum friction between the component parts until the system is to be stopped. At that time, the outlet for draining the fluid is operated causing the gear to fall engaging the brake.

The means for draining the space between the inner end wall of the hub and vertical shaft may comprise the same passageway for feeding the fluid to the space or an alternate passageway, both manually or electrically controlled for drainage, and thus braking, in non-emergency situations;

Pressure of the fluid by hydraulically supporting the gear may be controlled by an adjustable direct-acting pressure relief valve positioned in bypass circuitry to the reservoir when the pressure in the circuit exceeds a given level. In this event, the pressure of the fluid on the poppet of the valve overcomes the adjustable spring force and downstream pressure of the valve, opening the valve causing the oil to by-pass to the reservoir until the pressure equalizes and the poppet restores to its closed position. For cold day operation, when an initial extra pressure is required to lift the gear from the vertical shaft, a valve included in the circuitry remains closed until the gear has lifted a predetermined amount with respect to the brake surface and precludes the adjustable direct-acting relief valve from operating. After the gear is free to rotate, the valve is mechanically opened and pressure is thereafter controlled by the adjustable direct-acting relief valve. An alternative approach is to use a two-way normally open electrically operated valve which is electrically closed for a prescribed interim;

When the braking system is employed, by draining the fluid from the space between the hub and shaft, most emergency situations can be dealt with reliably and efficiently in that the weight of the rotor provides the braking force necessary to apply the brakes. Particularly, if little or no fluid fills the space between the hub and vertical shaft, the gear will settle on the brake pads and stop the rotation of the rotor. In this regard therefore, further bypass circuitry to the reservoir may be provided to drain all fluid and preclude further fluid from reaching the space when the electrical power to the wind turbine fails. To this end, the by-pass circuit may include a two-way electrically operated valve, closed when electrical power is available from the power grid to the wind turbine, but opens on the failure of such power allowing the oil to flow directly to the reservoir. One example of such valve is an electrically operated two-way direct-pilot-operated valve by Sperry Vickers having a movable magnetic core repelled from the stationary core when the valve is electrically connected to close the port by a spring-loaded sealing disc and seat. When the electricity fails, the valve opens, discharging the fluid to the reservoir;

Additionally, the braking action can be initiated when the angular velocity of the rotor exceeds a predetermined level. In this regard, fluid may be drained from the space by opening a valve leading from the space. This valve may employ a pendulum secured to pivot at a point on the rotor, weighted at its free end, and allowed to swing radially outwardly as the rotor rotates. The end of the arm secured to the point on the rotor may comprise a cam with a notch to engage a cam follower (spindle or poppet) disposed in the valve to follow the cam as the arm swings radially outwardly until the notch is presented to the poppet by the rotation of the cam. When the cam follower pops into the notch, the valve is opened. The notch is positioned on the cam to rotate to a position opposite the cam follower when the rotor rotates at an undesired predetermined angular velocity.

The pendulum arm may also be magnetically held against swinging, against the side of the rotor until the centrifugal force on the pendulum arm tending to swing the arm out exceeds the magnetic force holding the arm against the rotor at which time a poppet held in the valve opening is released opening the valve;

Additionally, the gear box assembly may be employed to tension the guy wires supporting the wind turbine during the rotation of the rotor. Particularly, as the guys are attached to a coupling on top of the rotor, when the gear is hydraulically supported by the fluid, the rotor is elevated raising the coupling thus tensioning the guy wires secured to the ground. The action of the pressure reducing valve maintains a constant hydraulic pressure which in turn provides a constant vertical upward thrust restrained by the guy wires, and weight of the rotor. By this approach, the nominal guy tensions are held constant irrespective of changing temperatures.

The invention will now be illustrated having regard to the following drawings illustrating a preferred embodiment of the invention and the detailed description thereof.

DETAILED DESCRIPTION OF PREFERRED EMBODIMENTS

Figure 1:
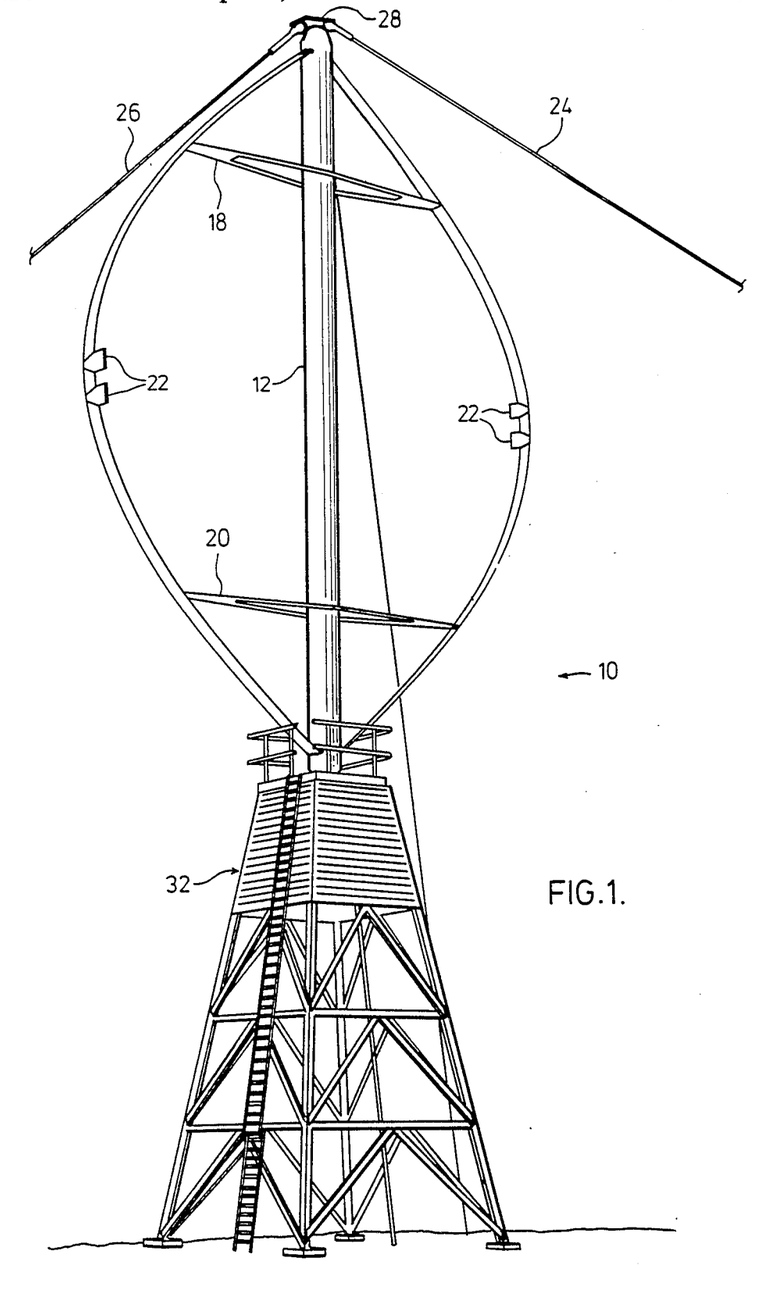
FIG. 1 is a perspective view of a Darrieus vertical axis wind turbine incorporating the gear box assembly according to a preferred embodiment of the invention.
Figure 2:
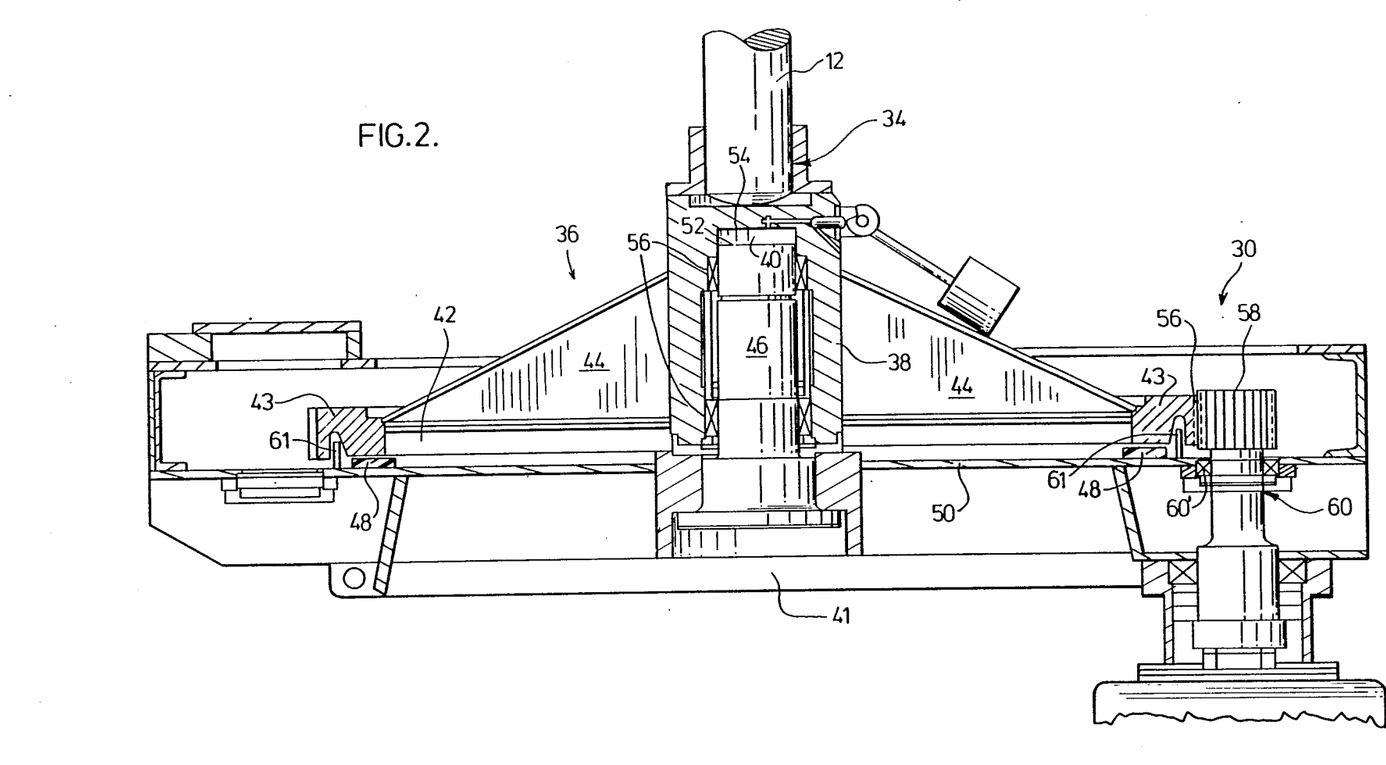
FIG. 2 is a side view of the gear box assembly according to a preferred embodiment of FIG. 1, partly in section with component parts cut away.
Figure 3:
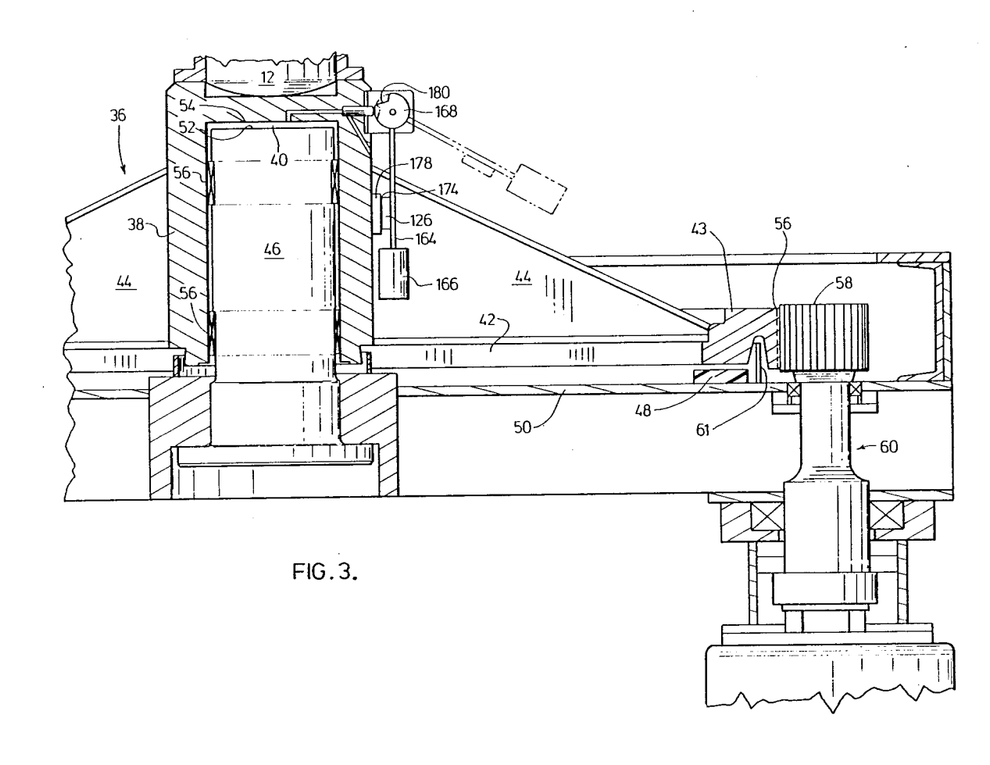
FIG. 3 is a close-up schematic view of part of the assembly shown in FIG. 2.
Figure 4:
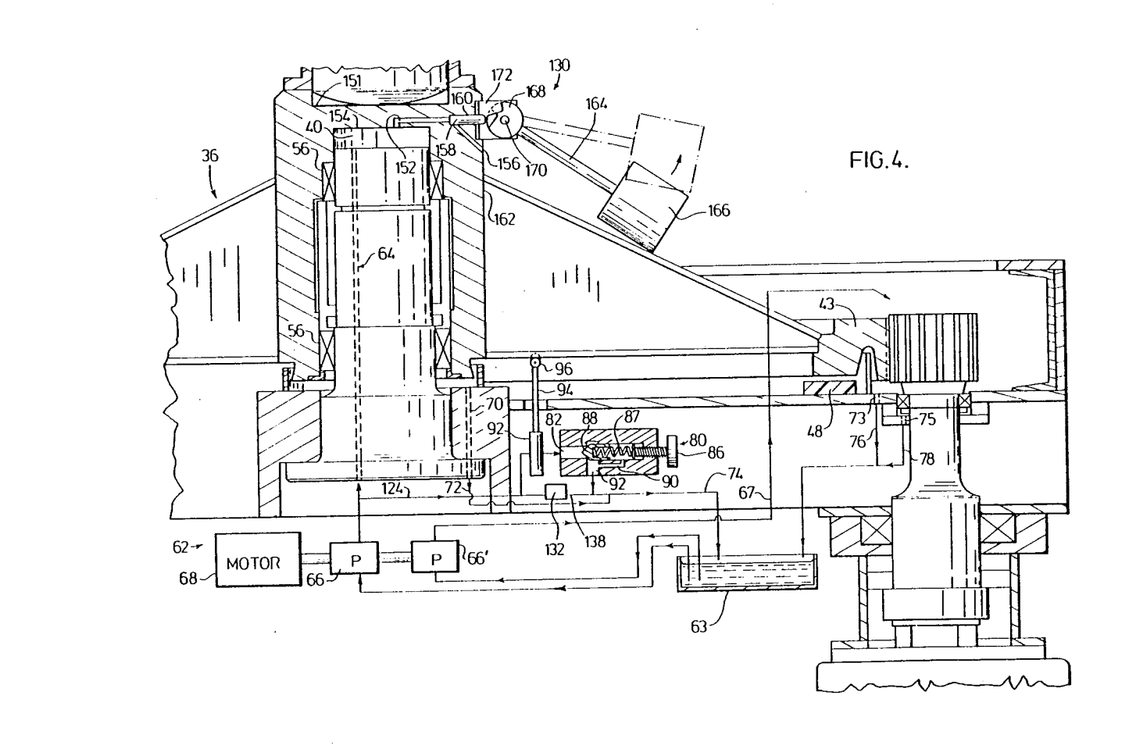
FIG. 4 is a close-up schematic view of part of the assembly shown in FIG. 3 showing the hydraulic circuitry.
Figure 5:
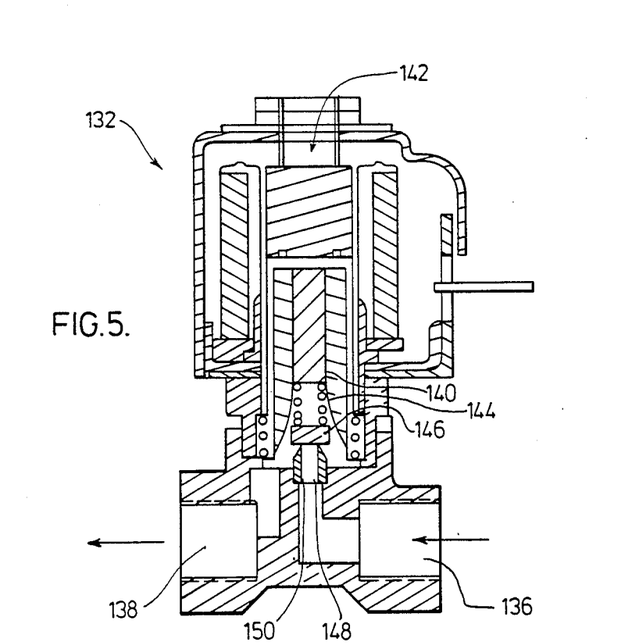
FIGS. 5 and 6 are detailed schematic sides views of valves shown diagrammatically in FIG. 4, the valve shown in FIG. 5 looking in a direction opposite the direction from which the circuitry is shown in FIG. 4.
Figure 6:
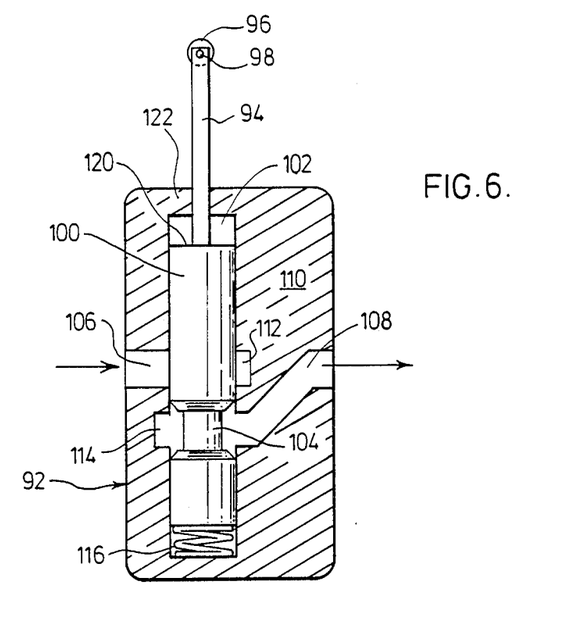
Figure 7:
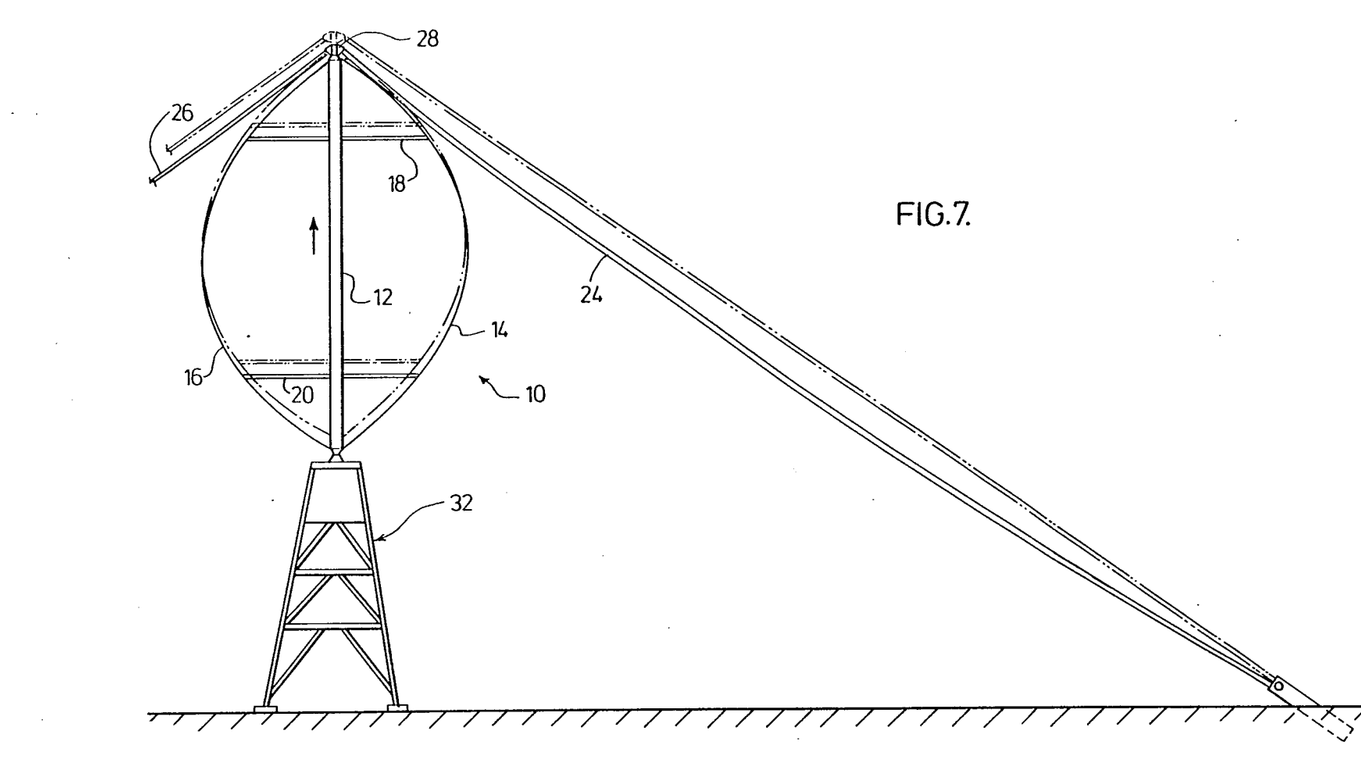
FIG. 7 is a side view of the vertical axis wind turbine shown in FIG. 1 supported by the guy wires.

With reference to FIG. 1, Darrieus vertical axis wind turbine 10 comprises vertical axis 12 and two rotor blades spaced from, and secured to, each other and to shaft 12, by connectors 18 and 20. Each of the blades support spoilers 22 for assisting to brake the speed of the rotor blades when their angular speed exceeds a predetermined angular speed. Four (4) guy wires two of which are shown as 24 and 26 are connected to, and support, wind turbine 10 through coupling 28. The lower end of shaft 12 is secured for rotation in gear box assembly 30 (See FIG. 2) mounted in tower 32;

With reference to FIG. 2, coupling 34 is provided on top of gear 36 for receiving and securing shaft 12 to gear box assembly 30. Bull Gear 36 includes central hub 38 overlying end 52 of shaft 46, bottom plate 42 secured to hub 38, gear ring 43 secured to the periphery of bottom plate 42, and triangular stiffening webs 44 secured between plate 42 and hub 38. Vertical shaft 46 of lesser diameter than hub 38 supported by base 41 supports gear 36 for rotation. and passes through base plate 50 supporting brake pads 48. Gear 36 rests on brake pads 48 on base plate 50 spacing the upper end 52 of shaft 46 from the hub end wall 54 of hub 38, providing space 40 therebetween. Hydrodynamic bearings 56 are secured between the inner wall of hub 38 and the outer surface of vertical shaft 46 for sealing the space created between ends 52 and 54. Hub 38 is free to rise with respect to vertical shaft 46, limited by guy wire reaction;

Gear 36 meshes with pinion 58 coupled to generator 60 for driving generator 60. Annular dam wall 61 sits on base 50 and separates the interior space under gear 36 from generator 60 and remainder of equipment (not shown);

Hub 38 is hydraulically supported with respect to shaft 46 by hydraulic fluid fed into space 40 by hydraulic circuitry 62 shown in FIG. 4. Hydraulic fluid is fed into space 40 from reservoir 63 through passageway 64 by pump 66 operated by electric motor 68. Bearing leakage from bearings 56 is returned via drain 70, outlet 72 and return 74 to reservoir 63. Pump 66[1] operated on a common axis as pump 66 by motor 68, pumps fluid through passageway 67 to lubricate the gear/pinion mesh. Fluid passing down from the lubrication of the gear/pinion mesh is collected through passageways 73 and 75 by returns 76 and 78;

Adjustable direct acting relief valve 80 controls the pressure of the fluid passing through passageway 64 to space 40 to hydraulically support hub 38 with respect to vertical shaft 46. Valve 80 comprises inlet 82 for the entry of hydraulic fluid, spring actuated poppet 88 (adjustable by adjustment screw 86 to compress or relieve the spring 87) to retract when the inlet pressure of the entry hydraulic fluid through inlet 82 exceeds the force of spring 87 on poppet 88 and the pressure exerted downstream on poppet 88 through drain port 90. When the upstream pressure exceeds the pressure at which poppet 88 will retract, fluid passes through valve 80 from pump 66 rather than up passageway 64. When the pressure in the system is less than that pressure opening valve 80, valve 80 remains closed. Any fluid passing through valve 80 out outlet port 92 is returned via return 74 to reservoir 63;

When initially raising gear 36 to be hydraulically supported on shaft 46, additional pressure may be needed (for example on a cold day). Directional control valve 92 (seen in FIG. 6) blocks fluid flow to pressure control valve 80 until gear 36 is hydraulically lifted a sufficient distance above shaft 46 by sufficient fluid in space 40. To this end, valve 92 includes arm 94 having bearing wheel 96 journalled for rotation on end 98, extending from valve spool 100 disposed in space 102 for accommodating spool 100 for longitudinal vertical movement thereof in space 102. Spool 100 is necked intermediate it ends at 104. Valve 92 includes inlet port 106 and outlet port 108 staggered with respect to one another with both passing through space 101 into valve housing wall 110 at 112 and 114 respectively. Compression spring 116 sits under spool 100 tending to push spool 100 and arm 94 vertically. Necking 104 is of sufficient length to permit open communication between inlet port 106 and outlet port 108 through necking 104 when top 120 of spool 100 abuts the top inner wall 122 defining the top of space 102 when compression spring 116 is able to force cylinder 100 vertically. Valve 92 is positioned to abut bearing wheel 96 on the underside of plate 42 of gear 36 when the brake pads 48 are sandwiched between the bottom of ring 43 and base 50 stopping rotation of bull gear 36 and thus shaft 12;

When gear 36 is to be hydraulically lifted, fluid is pumped by pump 66 through passageway 64 to space 40. At the same time, fluid attempts to pass down passageway 124 to valve 80 controlling the pressure. However, because valve 92 is initially in the position shown in FIG. 6, with spring 116 compressed and top end 122 of spool 100 spaced from top wall 122, necked portion 104 is in communication only with outlet 108. As base plate 42 of gear 36 rises, arm 94 secured to spool 100 is allowed to yield to the action of compression spring 116, positioning necked portion 104 in communication with inlet 106 and outlet 108, permitting fluid passage through valve 92 to pressure control valve 80 for controlling the pressure of hydraulic fluid passing to space 40. Plate 42 rises about ¼" before communication between inlet 106 and outlet 108 is achieved;

In cases of emergency, two safety assemblies have been provided; one in case of electrical power failure shown at 132 and the other 130 in case of the rotor rotating at a high unsafe angular speed;

In cases of power failure to the motor 68, two way direct-pilot-operated valve 132 manufactured by Sperry-Vickers shown in FIG. 5 immediately opens outlet port 138 to communicate with inlet port 136. To this end, valve 132 is electrically powered to normally repel magnetic movable core 140 from stationary core 142 so long as electrically connected to a power source, compressing spring 144 of spring loaded sealing disc 146 to seal port 148 by stainless steel seat 150. When the electric power is shut off the force of spring 144 forces core 140 away from sealing disc 146 releasing seat 148 opening communication between the two ports 136 and 138, draining all fluid from space 64, passageway 124, valves 80 and 92 through outlet 138 to reservoir 63;

In cases where the angular speed of the rotor is not safe, safety assembly 130 comes into play. Safety assembly 130 includes valve 151 having port 152 leading from space 40 through top wall 154 to outlet 156, closed by cam follower (spool or poppet) 158 secured in opening 160 through side wall 162 intersecting port 152. Assembly 130 also includes pendulum arm 164 having weight 166 on one end and cam 168 on the other pivotable on pin 170 secured to plate 172 secured to hub 38, and magnetic latching system 174 comprising magnet 176 on arm 164 and metal plate 178 on hub 38 for normally securing arm 164 to hub 38 by magnetic force (See FIG. 3) Cam 168 has notch 180 therein. As the rotor and hub increase their angular speed, arm 164 with weight 166 wants to be thrown radially outwardly but is prevented from doing so by the magnetic force between plate 178 and magnet 176, until the force tending to throw arm 164 and weight 166 radially outwardly is greater than the magnetic force holding it, releasing the arm causing cam follower 158 to follow the outer surface of cam 168 until it lodges in notch 180 by centrifugal force. The position of notch 180 on cam 168 is chosen to catch spindle 158 when arm 164 is released from plate 178 and swing about hub 38 at the undesirable angular speed. Notch 180 is of such depth into cam 168 to receive cam follower 158 to open port 152 to outlet 156. Therefore, at a predetermined angular speed, valve 151 opens releasing the fluid in space 40, causing hub 38 to settle on brake pads 48 to brake gear 36 and thus stop the rotor;

With reference to FIG. 7, it can be seen that the hydraulic support of gear 36 during the rotation of the rotor of wind turbine 10, causes the rotor and thus shaft 12, blades 14 and 16 and coupling 28 to rise, thus tensioning the guy wires securing and stabilizing the wind turbine during operation. When braking action is desired, gear 36 is allowed to settle onto the brake pads 48 by a release of the fluid pressure in space 40.

As many changes could be made to the preferred embodiments without departing from the scope of the invention, it is intended that all matter contained herein be interpreted as illustrative thereof, and not in a limiting sense.

The embodiments of the invention in which an exclusive property or privlege is claimed are as follows:

1. A braking system for a vertical axis wind turbine, having a bull gear and base for supporting the bull gear, the bull gear and base presenting a hollow housing and shaft, the housing for receiving the shaft, one of the said hollow housing or shaft being stationary and the other being rotatable and secured to the bull gear, and brake pads disposed between the bottom of the bull gear and base, a space between the housing and shaft when the shaft is received in the housing for receiving hydraulic fluid injected therein under pressure to free the bull gear and vertically support it relative to the base for rotation, and hydraulic circuitry to feed hydraulic fluid into, and drain fluid from the space.

2. A braking system for a vertical axis wind turbine having a bull gear having a hub for seating over, and for rotating about, a vertical shaft, by fluid injected between the vertical shaft and hub, the gear being adapted to be raised above the vertical shaft for rotation thereabove and to seat on a stationary base when rotation is to stop, and braking pads disposed between the base and bottom of the gear to stop the motion of the gear relative to the base when the gear is lowered onto the base.

3. An improved gear box assembly for a vertical axis wind turbine, the vertical axis wind turbine having a rotor having a centrally disposed axis oriented in the vertical direction, a bull gear supporting the rotor, a base below the bull gear, the bull gear being adapted to rotate above the base, the bull gear and base presenting, a hollow housing closed by an inner end wall, and a shaft terminating at an end surface, the housing for receiving the shaft, one of the said hollow housing or shaft being stationary, and the other being rotatable with respect to the stationary component and secured to the bull gear, the shaft and housing when secured together presenting a space between the inner end wall and end surface, bearings supported between the housing and shaft, and sealing means for sealing the space between the housing and shaft, a fluid passageway extending into the space created between the inner end wall and end surface for feeding hydraulic fluid under pressure into the space for hydraulically elevating the bull gear relative to the base, means precluding the gear from rising more than a predetermined or controlled distance, means for feeding the fluid under pressure to, and means for draining the fluid from, the space, and a reservoir for such fluid.

4. The improved gear box assembly of claim 3, wherein the fluid passageway extending into the space opens through the end surface and the sealing means comprises the bearings.

5. The improved gear box assembly of claim 3, wherein the means precluding the gear rising more than the controlled distance comprises guy wires secured to the upper end of the rotor.

6. The improved gear box assembly of claim 3, 4 or 5 wherein brake pads are disposed between the base and bull gear to stop the motion of the gear relative to the base when the gear is lowered onto the base.

7. The improved gear box assembly of claim 3, 4, or 6, wherein the means for draining the space between the inner wall of the hollow housing and vertical shaft comprises the same passageway as the passageway for feeding the space.

8. The improved gear box assembly of claim 3, 4, or 6, wherein the means for draining the space between the inner wall of the hollow housing and vertical shaft comprises a passageway either mechanically or electrically operable for draining.

9. The improved gear box assembly of claim 3, wherein the pressure of the fluid in the space between the vertical shaft and hollow housing is controlled by an adjustable direct-acting pressure relief valve positioned in by-pass circuitry to the reservoir when the pressure in the circuit exceeds a predetermined pressure level.

10. The improved gear box assembly of claim 9, wherein the direct acting pressure relief valve includes an inlet and outlet, a spring loaded poppet positioned in the inlet responsive to the inlet pressure of the fluid, a spring adjustment screw for adjusting the compressive force of the spring on the poppet, and a down-stream sensing passageway in communication with the outlet port and the spring of the spring actuated poppet.

11. The gear box assembly of claim 9 or 10, wherein a valve is disposed intermediate the adjustable direct acting pressure relief valve and fluid passageway to preclude fluid from reaching the direct acting pressure relief valve until the gear is freed to rotate by the pressure of the fluid fed into the space.

12. The gear box assembly of claim 3 further including electrically activated by-pass circuitry to pass fluid to the space when electrical power to the gear box assembly and thus to the electrically activated by-pass circuitry, is operational, but to by-pass fluid to the reservoir when the electrical power to the by-pass circuitry fails.

13. The gear box assembly of claim 12, wherein the by-pass circuitry includes a two-way electrically operated valve.

14. The gear box assembly of claim 13, wherein the two-way electrically operated valve is an electrically operated two way direct-pilot-operated valve having an inlet and outlet in communication with one another, a stationary core and magnetic core movable with respect to the stationary core, a spring loaded sealing disc and seat for closing communication between the inlet and outlet port, the magnetic core being repelled by the stationary core when the valve is electrically activated to compress the spring loaded sealing disc to close communication between the ports and being forced by the spring of the spring loaded sealing disc and seat away from the disc towards the stationary core when the electricity is removed from the valve opening communication between the inlet and outlet port.

15. The improved gear box assembly of claim 3, having means responsive to the angular velocity of the rotor of the wind turbine to drain the fluid from the space between the hollow housing and vertical shaft when the angular velocity of the rotor exceeds a predetermined angular velocity.

16. The gear box assembly of claim 15 wherein said means responsive to the angular velocity comprises a valve having an outlet leading from the space between the hub and vertical shaft to the exterior of the hollow housing, a cam follower lodged in the valve precluding flow through the outlet, a weighted pendulum arm having a cam having a notch therein on one end, the cam secured to pivot on a pivot pin secured to rotate with the rotor and hub to swing the pendulum radially outwardly when the rotor rotates at a predetermined angular velocity, the cam maintaining the cam follower in the valve until the rotor reaches a predetermined angular velocity at which point the cam follower, becomes lodge in the notch at which point the cam follower dislodges from the outlet opening the valve discharging the fluid from the space.

17. The gear box assembly of claim 16, wherein the pendulum arm is magnetically secured to a position adjacent the bull gear until the rotor rotates at the predetermined angular velocity.

18. An improved gear box assembly for a vertical axis wind turbine having a rotor having a centrally disposed axis in the vertical direction, a bull gear supporting the rotor for rotation therewith and having a centrally disposed annular hub of a predetermined inner diameter terminating at a hub end wall, the bull gear for transferring power generated by the wind, the improved gear box assembly comprising, a stationary centrally disposed cylindrical vertical shaft of a slightly lesser outer wall diameter than the internal diameter of the hub and having an upper end, the cylindrical vertical shaft being received in the hub, bearings and sealing means supported between the hub and vertical shaft for supporting the gear for rotation and for sealing the space between the vertical shaft and inner wall of the hub, means for spacing the upper end of the vertical shaft from engaging the end wall of the hub, a fluid passageway extending into the space created between the hub end wall and vertical shaft, for feeding hydraulic fluid under pressure against the hub end wall for raising and vertically supporting the gear with respect to the vertical shaft, means precluding the gear rising more than a predetermined distance and means for feeding and draining the fluid to and from the space between the hub and vertical shaft, and a reservoir for such fluid.

19. The improved gear box assembly of claim 18, wherein the fluid passageway extending into the space created between the hub wall and vertical shaft, opens through the upper end of the vertical shaft and the sealing means comprises the bearings.

20. The improved gear box assembly of claim 18, wherein the means precluding the gear rising more than a controlled distance comprises guy wires secured to the upper end of the rotor.

21. The improved gear box assembly of claim 18, wherein the gear box assembly is housed in a housing having a base, and brake pads are disposed between the base and the bull gear to be sandwiched therebetween when the gear is lowered onto the base to stop the motion of the gear.

22. The improved gear box assembly of claim 18, 19, or 21, wherein the means for draining the space between the inner wall of the hub and vertical shaft comprises the same passageway as the passageway for feeding the space.

23. The improved gear box assembly of claim 18, 19, or 21, wherein the means for draining the space between the inner wall of the hub and vertical shaft comprises a passageway either mechanically or electrically operable for drainage.

24. The improved gear box assembly of claim 18, wherein the pressure of the fluid in the space between the vertical shaft and hub is controlled by an adjustable direct-acting pressure relief valve positioned in by-pass circuitry to the reservoir when the pressure in the circuit exceeds a predetermined pressure level.

25. The improved gear box assembly of claim 24, wherein the direct acting pressure relief valve incudes an inlet and outlet, a spring loaded poppet positioned in the inlet responsive to the inlet pressure of the fluid, a spring adjustment screw for adjusting the compressive force of the spring on the poppet, and a down-stream sensing passageway in communication with the outlet port and the spring of the spring actuated poppet.

26. The improved gear box assembly of claim 24 or 25, wherein a valve is disposed intermediate the adjustable direct acting pressure relief valve and fluid passageway to preclude fluid from reaching the direct acting pressure relief valve until the gear is freed to rotate by the pressure of the fluid fed into the space.

27. The gear box assembly of claim 18, further including electrically activated by-pass circuitry to pass fluid to the space when electrical power to the gear box assembly and thus to the electrically activated by-pass circuitry, is operational, but to by-pass fluid to the reservoir when the electrical power to the by-pass circuitry fails.

28. The gear box assembly of claim 27, wherein the by-pass circuitry includes a two-way electrically operated valve.

29. The gear box assembly of claim 28, wherein the two-way electrically operated valve is an electrically operated two-way direct-pilot-operated valve having an inlet and outlet in communication with one another, a stationary core and magnetic core movable with respect to the stationary core, a spring loaded sealing disc and seat for closing communication between the inlet and outlet port, the magnetic core being repelled by the stationary core when the valve is electrically activated to compress the spring loaded sealing disc to close communication between the ports and being forced by the spring of the spring loaded sealing disc and seat away from the disc towards the stationary core when the electricity is removed from the valve opening communication between the inlet and outlet port.

30. The gear box assembly of claim 18, having means responsive to the angular velocity of the rotor of the wind turbine to drain the fluid from the space between the hub and vertical shaft when the angular velocity of the rotor exceeds a predetermined angular velocity.

31. The gear box assembly of claim 30, wherein said means responsive to the angular velocity comprises a valve having an outlet leading from the space between the hub and vertical shaft to the exterior of the hub, a cam follower lodges in the valve precluding flow through the outlet, a weighted pendulum arm having a cam having a notch therein on one end, the cam secured to pivot on a pivot pin secured to rotate with the rotor and hub to swing the pendulum radially outwardly when the rotor rotates at a predetermined angular velocity, the cam maintaining the cam follower in the valve until the rotor reaches a predetermined angular velocity at which point the cam follower becomes lodged in the notch at which point the cam follower dislodges from the outlet opening the valve discharging the fluid from the space.

32. The gear box assembly of claim 31, wherein the pendulum arm is magnetically secured to a position adjacent the bull gear until the rotor rotates at the predetermined angular velocity.

* * * * *